United States Patent
Bravet et al.

(10) Patent No.: US 7,101,611 B2
(45) Date of Patent: *Sep. 5, 2006

(54) PLASTIC WINDOW, ESPECIALLY FOR MOTOR VEHICLES, AND PROCESS FOR ITS MANUFACTURE

(75) Inventors: Jean-Louis Bravet, Thourotte (FR); Marc Maurer, Verviers (BE)

(73) Assignee: Saint-Gobain Glass France, Courbevoie (FR)

( * ) Notice: Subject to any disclaimer, the term of this patent is extended or adjusted under 35 U.S.C. 154(b) by 46 days.

This patent is subject to a terminal disclaimer.

(21) Appl. No.: 11/169,658

(22) Filed: Jun. 30, 2005

(65) Prior Publication Data

US 2005/0238902 A1    Oct. 27, 2005

Related U.S. Application Data

(63) Continuation of application No. 09/147,813, filed as application No. PCT/FR98/01513 on Aug. 31, 1999.

(30) Foreign Application Priority Data

Jul. 15, 1997  (FR) .................................. 97 08934

(51) Int. Cl.
  *B32B 7/02*  (2006.01)
  *B32B 27/08*  (2006.01)
  *B32B 27/30*  (2006.01)
  *B32B 27/36*  (2006.01)
  *B32B 37/14*  (2006.01)

(52) U.S. Cl. .................... 428/215; 428/421; 428/425.5; 428/457; 428/480; 428/500; 428/522; 428/523; 428/702; 156/99; 156/104; 156/105; 156/272.6; 156/82; 156/242; 156/245; 156/324

(58) Field of Classification Search ................ 428/215, 428/412, 421, 425.5, 457, 480, 500, 522, 428/523, 702; 156/99, 104, 105, 272.6, 82, 156/242, 245, 324

See application file for complete search history.

(56) References Cited

U.S. PATENT DOCUMENTS

| 4,112,171 | A | 9/1978 | Motter et al. |
| 4,386,042 | A | 5/1983 | Tatebayashi |
| 4,634,637 | A | 1/1987 | Oliver et al. |
| 4,946,531 | A | 8/1990 | Crouch et al. |
| 5,525,401 | A | 6/1996 | Hirmer |
| 5,849,414 | A | 12/1998 | Bier et al. |
| 6,811,857 | B1 | 11/2004 | Bravet et al. |

FOREIGN PATENT DOCUMENTS

| EP | 0 353 677 | 2/1990 |
| EP | 0 524 417 | 1/1993 |
| EP | 0 718 348 | 6/1996 |
| GB | 2 092 511 | 8/1982 |
| NL | 8 501 897 | 2/1987 |

OTHER PUBLICATIONS

Mark Alger, The Polymer Science Dictionary (2d. ed.) Chapman & Hall, pp. 261-262, 434 (1997).
MatWeb.com Online Material Data Sheet, Overview-Polycarbonate, Optical Grade (May 2005).
Derwent Publications, AN 92-419600, XP002060340, JP 04 314771 A (Nov. 5, 1992).

*Primary Examiner*—Ramsey Zacharia
(74) *Attorney, Agent, or Firm*—Oblon, Spivak, McClelland, Maier & Neustadt, P.C.

(57) ABSTRACT

The invention relates to a product which is at least partly transparent and of high optical quality, equivalent to that of a glass window, which can be approved as a motor-vehicle window according to the various standards in force, and having a plastic core coated with a skin comprising at least one plastic film coated with a scratch-resistant layer; it also relates to a process for manufacturing this product and to the application of the latter as a body element, part of which forms a window, for example for motor vehicles.

30 Claims, No Drawings

PLASTIC WINDOW, ESPECIALLY FOR MOTOR VEHICLES, AND PROCESS FOR ITS MANUFACTURE

This is a continuation application of U.S. application Ser. No. 09/147,813, filed Aug. 31, 1999.

BACKGROUND OF THE INVENTION

1. Field of the Invention

The present invention relates to at least partly transparent products made of plastic, especially products of high optical quality, equivalent to that of a glass window. It is conceivable to replace glass sheets with plastic sheets in the construction of windows, for example for buildings or transport vehicles.

2. Description of the Background

Compared with glass, plastics are lower in weight, which is a key advantage in the case of electrically driven town vehicles, in so far as an increase in their range is crucial. In such vehicles, it could even be envisaged producing, from plastic, in a single unit, entire doors or even complete sides of the body, including the windows, and, optionally, painting a lower part thereof. In general, the low weight of the transparent surfaces is relatively advantageous in the case of modern transport vehicles in so far as technical progress is going hand in hand with integration into windows of still more numerous functions (heated rear window, radio antenna, windscreen de-icing, colouration in order to prevent the passenger compartment heating up in strong sunlight, incorporation of electrochromic compounds, display of information on the windscreen, etc.) and with ever increasing amounts of glazed surfaces. This results in a general increase in the vehicle weight, to the detriment of its energy consumption.

Moreover, compared with glass, plastics are capable of providing improved safety conditions and superior anti-theft protection because of their greater toughness.

A not insignificant advantage of plastics compared with glass resides in their superior ability to be easily converted into complex shapes.

Finally, the ability of plastic sheets to be deformed substantially reversibly makes it possible to envisage ways of fitting them into considerably simplified body openings by a snap-fastening mechanism, from the inside just as from the outside of the vehicle.

According to a first approach, flat plastic sheets are formed by extrusion, a component is cut to the required dimensions and fastened to a thermoforming device, a contact thermoforming operation is carried out with at least one solid mould surface and, optionally, with the aid of compressed air or suction. The optical properties of a sheet thus extruded are not satisfactory.

Furthermore, the scratchability of plastics, mentioned previously, is such that, in their optical applications or as transparent elements, it is necessary to coat the shaped components with a hard varnish. This operation is accompanied, as is well known to those skilled in the art, by problems of the varnish flaking, these problems being more acute in the case of surfaces of complex shapes. In addition, it has only been envisaged forming the hard varnish at a temperature below the deformation temperature or softening point of the plastic, the shape of which is thus entirely preserved during this operation. Such conditions of forming the varnish are excessively restrictive and have resulted in considerable effort being expended to produce varnishes which form at sufficiently low temperatures and, at the same time, thermoplastics with high softening points. There therefore remained the need for a plastic which is transparent or intended for optical applications, in which the poor optical quality inherent in the extrusion technique and the problem of the varnish flaking would be avoided and in which many varnishes could be employed in combination with many plastics under satisfactory comparability conditions.

This product should be capable of being obtained by an inexpensive, reliable and simple process.

SUMMARY OF THE INVENTION

These objectives are presently achieved by the invention, the subject of which is a product which is at least partly transparent and of high optical quality. More particularly, the invention resides in the fact that this product comprises a plastic core integral with a skin comprising at least one plastic film supporting a scratch-resistant layer.

This is because the property by which the scratch-resistant layer is supported on a plastic film guarantees easy and reliable procurement of an end-product of lasting high optical quality, as will become apparent in the rest of the description. It makes it possible to produce such an end-product on the basis of the scratch-resistant layer on its support film in a physical and chemical state which will not be modified consequently, or only very slightly, by combining it with the core especially by injection moulding the plastic of which it is composed. The use of certain scratch-resistant varnishes forming at relatively high temperatures optionally requires choosing a material for the support film which is sophisticated but in a low quantity.

DETAILED DESCRIPTION OF THE PREFERRED EMBODIMENTS

The expression "high optical quality or optical quality equivalent to that of a window" is understood to mean, in the sense of the invention, "optical quality equivalent to that of a glass window, which can be approved as a motor-vehicle window according to the various standards in force, especially the R 43 standard in use in France".

Whatever the material of the core, the injection-moulding temperatures should not, of course, affect the other constituents of the product. This material may be chosen from many plastics; it may be a conventional inexpensive thermoplastic having a relatively low softening point. According to the invention, the plastic of the core is capable of interacting with the skin for the purpose of obtaining high optical quality, while at the same time having the desired mechanical properties, in particular flexural strength and impact strength.

Preferably, the skin has a thickness at most equal to 500 μm, particularly preferably between 10 and 100 μm, and comprises one or more transparent thermoformable plastic films, for example made of polycarbonate (PC), polypropylene (PP), poly(methyl methacrylate) (PMMA), an ethylene/vinyl acetate copolymer (EVA), poly(ethylene terephthalate) (PET), polyurethane (PU), polyvinyl butyral (PVB) or a cycloolefin copolymer (COC), i.e. an ethylene/norbornene copolymer or an ethylene/cyclopentadiene copolymer. One or more functions may be assigned to some of these thermoformable plastic films by the incorporation of suitable agents. Depending on its thickness and its nature, the skin is capable of contributing to a greater or lesser extent to the mechanical properties of the product.

Moreover, a functional layer may be deposited on a thermoformable plastic film of the skin, this being, in particular, the case with the scratch-resistant layer. Finally, a functional layer may be sandwiched, autonomously, between two thermoformable plastic films.

Advantageously, the scratch-resistant layer has a thickness of between 1 and 10 µm; generally, it forms the external surface of the product of the invention. It may essentially be inorganic and especially consist of polysiloxanes and/or of derivatives of silica and/or alumina, or a hybrid, such as consisting of networks of entangled inorganic and organic molecular chains linked to each other by means of silicon-carbon bonds. Such a hybrid layer exhibits excellent transparency, adhesion and scratch-resistance properties. It appears that the inorganic network gives the coating its hardness and its scratch resistance while the organic network gives it its elasticity and its toughness. Such varnishes are well known and have been described in the published applications EP-A1-0,524,417 and EP-A1-0,718,348, the teaching of which is incorporated here by way of reference; some of these varnishes are especially denoted by the registered trademark "Ormocer" which is an abbreviation for "Organically Modified Ceramic". It is worth pointing out that the firing temperature of Ormocers is easily adaptable by varying the relative amounts of the organic polymer fraction and the inorganic fraction. With regard to the plastic of the support film, it may be useful, or indeed necessary, to adapt its composition so as to make it compatible with the method and temperature of deposition of the scratch-resistant layer.

Other functionalities may be incorporated into the skin.

According to one particular embodiment, the external layer of the skin, in contact with the environment, contains a hydrophobic/oleophobic agent which therefore imparts this property to the external surface of the product. As hydrophobic/oleophobic agent, fluorinated polysilanes are well known, especially those obtained from precursors having a hydrolysable alkoxy- or halogeno-type functional group at one end, this functional group serving for chemical bonding to the substrate, and a perfluorinated carbon chain at the other end, this chain being intended to constitute the external surface of the product.

The hydrophobic/oleophobic agent is, in decreasing order of preference, incorporated into the scratch-resistant layer, which has a chemical structure close to its own, or with which it is at the very least chemically compatible, or grafted in the form of a thin layer having a thickness of between 2 and 50 nm, preferably onto the scratch-resistant layer, or alternatively self-supported on a plastic film, such as a poly(vinyl fluoride) (PVF) or a poly(vinylidene fluoride) (PVDF), to be advantageously applied directly to the scratch-resistant layer.

According to a variant, at least one decorative and/or masking layer, covering all or part of the surface of the product, is positioned in the skin, preferably directly under the support film of the scratch-resistant layer.

This layer may, for example, replace the screen-printed decoration often deposited around the periphery of the internal face of windows, especially for motor vehicles, for the purpose of masking, in the case of an observer outside the vehicle, the body elements forming the frame of the opening and the adhesive bead which is thus protected from degradation by ultraviolet radiation. This layer may include opaque or transparent coloured decorative elements, making it possible to produce coloured elements matching the body or the internal fittings, logos, etc.

The skin may be provided with an adhesion layer, in particular on its internal face for fastening to the core, but also between two films or layers of the skin. Standard adhesives are polyvinyl butyral or polyurethane.

Finally, among the main constituents of the skin are the optically selective layers which are stacked, for example beneath the decorative and/or masking layer. These layers are distinguished by a high transmission in the visible range (wavelengths from 400 to 800 nm) and a high absorption and/or reflection in the ultraviolet range (<400 nm) and infrared range (>800 nm). These layers may consist of thin metal layers, for example based on silver, having thicknesses of between 2 and 35 nm, separated from each other, as well as from other adjacent layers or films, by dielectric layers of oxides or nitrides of indium, tin, silicon, zinc, titanium, tungsten, tantalum, niobium, aluminium, zirconium, etc., generally having thicknesses of between 10 and 150 nm. These layers may include at least one bulk-coloured layer.

The combination of these layers may be electrically conductive; it may belong to the family of solar-protection stacks used for limiting the influx of heat by solar radiation into closed spaces or to that of low-emissivity stacks used, on the contrary, to limit the loss of heat from closed spaces, this loss being mainly due to transmission of infrared radiation through the window. Such stacks are described in Patents FR 2,708,926 and EP 0,678,484.

The core of the product of the invention consists of a thermoplastic such as polycarbonate, poly(methyl methacrylate), an ethylene/vinyl acetate copolymer, poly(ethylene terephthalate), a cycloolefin copolymer (for example, an ethylene/norbornene or ethylene/cyclopentadiene copolymer), or of an ionomer resin (an ethylene/methacrylic acid copolymer or an ethylene/acrylic acid copolymer neutralized with a polyamine, etc.), or of a thermosetting or thermally crosslinkable material (polyurethane, unsaturated polyester, ethylene/vinyl acetate copolymer), or else of a combination of several thicknesses of the same one or several of these plastics, on condition that the core is chemically compatible with the skin of the product according to the invention and gives the assembly the required mechanical properties.

The subject of the invention is also a process for manufacturing the product described above.

In a first phase of this process, the constituents of the skin are assembled, this being in the form of a ply or developed, optionally plane.

The scratch-resistant layer, when it is made of polysiloxanes, is advantageously formed cold on its support film and/or by plasma-enhanced deposition, such as plasma CVD (Chemical Vapour Deposition). Insofar as polysiloxanes formed in this way are no longer reactive, having already completely reacted, it is necessary to choose the composition of the scratch-resistant layer so that it can be bent, in order to avoid subsequent flaking problems.

When the scratch-resistant layer consists of Ormocers, these are applied flat in the form of liquid precursors to the support film, using the conventional techniques of flow coating, dip coating, especially in a bath of small volume for the sake of economizing, liquid spraying or curtain spraying. The precursor consists, for example, of colloidal dispersions in solvents of several hybrid compounds, that is to say compounds which are both organic and inorganic, or of low-molecular-weight polymers functionalized by SiOR groups in a mixture with tetraethoxysilane. The scratch-resistant layer is then cured using a sol-gel process in which the precursor is firstly dried, passing through the intermediate state of a gel, by moderate radiation or heating, especially, in the latter case, at less than 50° C. The support film is then always held substantially flat; the curing of the Ormocer is completed during the second phase of the process, described below, which consists in thermoforming the said skin by ultraviolet radiation and/or heating to temperatures of 100 to 300° C., and more specifically 140–240° C.

In either case, the layers, in particular the scratch-resistant layer on the assembled and bent end-product, meet the required properties for its use, especially the regulation optical properties when it is to be used as glazing or as an element comprising a window for a transport vehicle, especially a motor vehicle.

The often complex shapes of motor-vehicle windows mean that the scratch-resistant layer in particular must be able to be bent without flaking and without cracking. Thus, advantageously, the scratch-resistant layer is only fully cured after its support has been shaped and, preferably, it only starts to cure and crosslink at the same time as its support is being shaped, so as finally to have a surface appearance without crazing or flaking.

The deposition and formation techniques which have just been described may also be used for incorporating the hydrophobic/oleophobic function, whether the corresponding agent forms an integral part of the scratch-resistant layer or is supported on a plastic film; when it is grafted on as a thin layer, it is also preferably formed by depositing it in liquid form by spraying, if it consists of silanes, or by evaporation using techniques such as plasma CVD, optionally under vacuum.

The decorative and masking layer or layers are provided on support films, especially made of plastic, according to the techniques used in printing: screen printing, flexography, ink-jet printing, laser printing, etc.

The adhesion layer is usually provided in the form of an integral thermoplastic film.

The formation of optically selective stacks makes use of successive deposition operations using sputtering, especially sputtering assisted by a magnetic field, or the like. In this regard, reference may again be made to Patents FR 2,708, 926 and EP 0,678,484.

The first phase of the process of the invention for forming the substantially flat skin may be concluded by an operation whose purpose is to consolidate the constituents thereof to a greater or lesser extent, especially by cold calendering or calendering at a temperature slightly above room temperature.

As briefly mentioned above, the second phase of the process consists in thermoforming the skin at a preferred temperature of 100–300° C. into a shape, optionally non-developable, identical to that of the end-product.

To do this, it is advantageous, in particular in order to complete the curing and/or crosslinking of the scratch-resistant layer, to allow it to come into contact with the ambient atmosphere, that is to say without coming into contact with solid elements; only the other face of the skin is then in contact with a support whose purpose is to give it shape. Auxiliary means, for example, blowing or suction means, may be used to shape at least part of the skin to this support. Apart from completing the crosslinking of certain constituents, the heat treatment carried out in this second phase has the effect of relaxing the stresses in the skin.

The third phase of the process of the invention consists in joining the skin to a plastic core by hot pressing in a form or by thermoplastic injection moulding or reactive injection moulding (RIM) of the material of the core, the skin having been positioned in the bottom of the mould, at the start of this third phase, in such a way that its scratch-resistant layer and/or its hydrophobic/oleophobic layer, which layer is fully cured and/or crosslinked, i.e. virtually no longer reactive, is in direct contact with the mould wall.

Another object of the invention is the application of the product described above as a body element, a transparent part of which forms a window, especially for motor vehicles.

The invention will now be illustrated by the following example.

EXAMPLE

The scratch-resistant coating described in the example in Patent Application EP-A-0,718,348 is deposited as a 20 μm thick liquid film on an 80 μm thick film of standard polycarbonate prepared from bisphenol A, sold by Bayer AG under the registered trademark "Makrolon®", which has a glass transition temperature $T_g$ equal to 145° C., by flow coating. Upon drying, this thickness is reduced to 5 μm.

The coated support film is then placed in the bottom of a mould, the scratch-resistant layer being positioned on top; the assembly is then subjected to a heat treatment of 155° C. for 30 min. A skin in the sense of the present invention is then formed, this having its virtually final shape.

The skin is placed in the bottom of an injection mould so that the scratch-resistant layer is in contact with the mould wall. There then follows, in the manner described above, the thermoplastic injection moulding, on two different specimens, of a 5 mm thick layer, on the one hand, and a 10 mm thick layer, on the other hand, of the same standard polycarbonate as that making up the support film of the scratch-resistant layer.

The laminate obtained exhibits a transparency and an optical quality which are amply sufficient for application as a window.

The process of the invention has the advantages inherent in the injection-moulding technique. It is thus possible to form the injection-moulded component with a peripheral bead in order to increase its stiffness, or with a relief and/or extensions, such as ribs, profiles, tabs or lugs, and/or to arrange one or more inserts, especially metal inserts, in the plastic. This arrangement is particularly useful for gripping or fastening the product of the invention, as well as for fitting it in its intended final position, such as in a body opening of a motor vehicle. In the latter case, forming suitable peripheral profiles makes it possible to envisage fitting the product from inside the vehicle, i.e. from inside the passenger compartment. The adhesive bead is then placed under the edge of the body opening and is not exposed to solar radiation. Protecting the adhesive bead with a varnish formed around the periphery of the internal face of the sheet becomes, of course, superfluous.

The appendages formed around the periphery of the product while it is being injection moulded may be preserved, or sawn off completely or partly depending on their use. After such sawing, a rubbing-down operation may be provided.

A peripheral profile with a geometry which is symmetrical with respect to the plane of the product may be opportune, for example in the case of transparent side surfaces of transport vehicles, it being possible for one or other part of the profile to be subsequently sawn off, depending on whether it is a left-hand or right-hand transparent element.

Moreover, optional inserts may be associated with the incorporation into the product of special functions, such as a stop light in a rear window.

Finally, the process of the invention is economic, easy and reliable and allows the use of many combinations of constituents without the problem of their compatability, especially from the standpoint of their processing temperatures, arising.

The invention claimed is:

1. A glass-free motor vehicle window, which is at least partly transparent, and which meets French standard R43 for motor vehicle windows, which comprises:
   a.) a plastic layer having a thickness of 5 to 10 mm,
   b.) at least one skin layer of a plastic film having a thickness of 10 to 100 µm coated on said plastic layer, with no layer between the plastic layer and the at least one skin layer, and
   c.) a scratch-resistant layer having a thickness of 1 to 10 µm supported by said plastic film,
   wherein said window is prepared by the following process (A) or process (B), wherein process (A) comprises:
   1.) providing said skin layer b.), either flat or in shaped form,
   2.) subjecting said skin layer to heat treatment, the skin layer, being supported completely or partly by a mould surface, an auxiliary means for shaping at least part of the skin to the said mould surface being optionally provided so as to relax stresses in the skin, and crosslinking constituent elements of the scratch-resistant layer; and
   3.) joining the skin to said plastic layer a.) by hot pressing in a form, or by thermoplastic injection moulding or reactive injection moulding of the material of the plastic layer a.), the skin having been positioned in the bottom of the mould in such a way that a scratch-resistant layer c.) is in direct contact with the mould; and process (B) comprises:
   1.) depositing the constituent elements of a scratch-resistant layer on a substantially flat plastic film; and
   2.) shaping said film bearing the elements of the scratch-resistant layer into a shape which is the same as or at least similar to the ultimate shape of the end-product, while at the same time at least partly crosslinking the scratch-resistant layer.

2. The glass-free motor vehicle window according to claim 1, wherein said plastic layer a.) comprises a thermoplastic, comprising polycarbonate, poly(methylmethacrylate), an ethylene/vinyl acetate copolymer, poly(ethylene terephthalate), polyurethane or a cycloolefin copolymer, or an ionomer resin or a thermosetting or thermally crosslinkable material of a polyurethane, unsaturated polyester or ethylene/vinyl acetate copolymer, or a combination of several thicknesses of the same or several of these plastics.

3. The glass-free motor vehicle window according to claim 1, wherein said skin layer b.) comprises of one or more transparent thermoformable plastic films made of polycarbonate, polypropylene, poly(methyl methacrylate), an ethylene/vinyl acetate copolymer, poly(ethylene terephthalate), polyurethane, polyvinyl butyral or a cycloolefin copolymer.

4. The glass-free motor vehicle window according to claim 3, wherein interposed between plastic films (b.) or deposited on said plastic film b), is at least one functional layer.

5. The glass-free motor vehicle window according to claim 1, wherein said scratch-resistant layer c.) is inorganic, or consists essentially of networks of entangled inorganic and organic molecular chains linked to each other by silicon-carbon bonds.

6. The glass-free motor vehicle window according to claim 5, wherein said inorganic scratch-resistant layer c.) consists essentially of polysiloxanes, silica or alumina.

7. The glass-free motor vehicle window according to claim 1, wherein an external layer of said glass-free motor vehicle window comprises a hydrophobic/oleophobic agent which is incorporated into said scratch-resistant layer c.), grafted onto said scratch-resistant layer c.), or self-supported on a film of poly(vinylfluoride) or poly(vinylidene fluoride) applied directly to said scratch-resistant layer c.).

8. The glass-free motor vehicle window according to claim 7, wherein said hydrophilic/oleophilic agent is obtained from precursor silanes having a hydrolyzable alkoxy- or halo-functional group at one end and a perfluorinated carbon chain at the other end.

9. The glass-free automobile window according to claim 1, wherein said skin layer b) includes at least one decorative or masking layer or both covering all or part of the surface of the window.

10. The glass-free automobile window according to claim 1, wherein the skin layer b.) includes one or more optically selective layers, having thicknesses of between 2 and 35 nm and separated from each other, as well as from other adjacent layers or films, by dielectric layers.

11. The glass-free automobile window according to claim 10, wherein said optically selective layers are metal layers.

12. The glass-free automobile window according to claim 1, wherein said scratch resistant layer c.) has a surface appearance without any crazing.

13. A method of incorporating a body element, at least a portion of which is transparent, in a manufactured object, which comprises incorporating the glass-free automobile window according to claim 1, into an automobile.

14. The glass-free motor vehicle window according to claim 1, wherein said skin layer b.) has a thickness of 10 to 80 µm.

15. A process for preparing a glass-free automobile window which is at least partly transparent, and which meets French standard R43 for motor vehicle windows, which comprises:
   a.) a plastic layer having a thickness of 5 to 10 mm,
   b.) at least one skin layer of a plastic film having a thickness of 10 to 100 µm coated on said plastic layer, with no layer between the plastic layer and the at least one skin layer, and
   c.) a scratch-resistant layer having a thickness of 1 to 10 µm supported by said plastic film, which process comprises:
   1.) providing said skin layer b.), either flat or in shaped form,
   2.) subjecting said skin layer to heat treatment, the skin layer, being supported completely or partly by a mould surface, an auxiliary means for shaping at least part of the skin to the said mould surface being optionally provided so as to relax stresses in the skin, and crosslinking constituent elements of the scratch-resistant layer; and
   3.) joining the skin to said plastic layer a.) by hot pressing in a form, or by thermoplastic injection moulding or reactive injection moulding of the material of the plastic layer a.), the skin having been positioned in the bottom of the mould in such a way that a scratch-resistant layer c.) is in direct contact with the mould.

16. The process of claim 15, wherein said constituent elements are supplied by screen printing, flexography, ink jet printing, laser printing, dip coating or spraying.

17. The process of claim 15, wherein in step 2), said heat treatment is effected at 100° to 300° C.

18. The process of claim 15, wherein said skin layer b.) has a thickness of 10 to 80 µm.

19. A process for preparing a glass-free automobile window which is at least partly transparent, and which meets French standard R43 for motor vehicle windows, which comprises:
   a.) a plastic layer having a thickness of 5 to 10 mm,
   b.) at least one skin layer of a plastic film having a thickness of 10 to 100 μm coated on said plastic layer, with no layer between the plastic layer and the at least one skin layer, and
   c.) a scratch-resistant layer having a thickness of 1 to 10 μm supported by said plastic film, which process comprises:
   1.) depositing the constituent elements of a scratch-resistant layer on a substantially flat plastic film; and
   2.) shaping said film bearing the elements of the scratch-resistant layer into a shape which is the same as or at least similar to the ultimate shape of the end-product, while at the same time at least partly crosslinking the scratch-resistant layer.

20. The process of claim 19, wherein the crosslinking and simultaneous shaping involve a heat treatment at a temperature of from 100 and 300° C.

21. The process of claim 20, wherein the temperature is from 140 to 240° C.

22. The process of claim 19, wherein the shaping is carried out by supporting the film coated with the scratch-resistant layer, or the elements intended to constitute this layer, at least on part of its surface, by a mould.

23. The process of claim 19, wherein the mould carrying the film is a frame open at its center.

24. The process of claim 19, wherein the film coated with the scratch-resistant layer of elements constituting this layer is combined, before shaping, with one or more other films which themselves fulfill functions or carry means for carrying out these functions other than the scratch-resistance function.

25. The process of claim 19, wherein said skin layer b.) has a thickness of 10 to 80 μm.

26. A glass-free motor vehicle window, which is at least partly transparent, and which meets French standard R43 for motor vehicle windows, which comprises:
   a.) a plastic layer having a thickness of 5 to 10 mm,
   b.) at least one skin layer of a plastic film having a thickness of 10 to 100 μm coated on said plastic layer, with no layer between the plastic layer and the at least one skin layer, and
   c.) a scratch-resistant layer having a thickness of 1 to 10 μm supported by said plastic film,
   wherein said scratch-resistant layer c.) is essentially inorganic or consists essentially of networks of entangled inorganic and organic molecular chains linked to each other by silicon-carbon bonds.

27. The glass-free motor vehicle window according to claim 26, wherein said scratch-resistant layer c.) consists essentially of networks of entangled inorganic and organic molecular chains linked to each other by silicon-carbon bonds.

28. The glass-free motor vehicle window according to claim 27, wherein said networks of entangled inorganic and organic molecular chains linked to each other by silicon-carbon bonds are provided by an Ormocer varnish.

29. The glass-free motor vehicle window according to claim 26, wherein said skin layer b.) has a thickness of 10 to 80 μm.

30. A glass-free motor vehicle window, which is at least partly transparent, and which meets French standard R43 for motor vehicle windows, which comprises:
   a.) a plastic layer having a thickness of 5 to 10 mm,
   b.) at least one skin layer of a plastic film having a thickness of 10 to 100 μm coated on said plastic layer, with no layer between the plastic layer and the at least one skin layer, and
   c.) a scratch-resistant layer having a thickness of 1 to 10 μm supported by said plastic film.

* * * * *